(12) United States Patent
Dia

(10) Patent No.: US 9,428,871 B1
(45) Date of Patent: Aug. 30, 2016

(54) ORIGINAL CAUTION TAPE RETAINER

(71) Applicant: Curtis F. Dia, East Northport, NY (US)

(72) Inventor: Curtis F. Dia, East Northport, NY (US)

(73) Assignee: Curtis F. Dia, East Northport, NY (US)

( * ) Notice: Subject to any disclaimer, the term of this patent is extended or adjusted under 35 U.S.C. 154(b) by 0 days.

(21) Appl. No.: 14/645,863

(22) Filed: Mar. 12, 2015

(51) Int. Cl.
*E01F 9/012* (2006.01)
*E01F 13/02* (2006.01)
*F16M 13/02* (2006.01)
*F16B 2/22* (2006.01)

(52) U.S. Cl.
CPC ............ *E01F 13/028* (2013.01); *F16B 2/22* (2013.01); *F16M 13/022* (2013.01)

(58) Field of Classification Search
CPC ......... E01F 13/02; E01F 13/028; F16B 2/22; F16M 13/022; A01D 34/822; A47B 2097/003; H02G 11/00
USPC ........... 248/231.81, 300, 301, 51, 52, 213.2; 116/63 C; 428/80
See application file for complete search history.

(56) References Cited

U.S. PATENT DOCUMENTS

| | | | | |
|---|---|---|---|---|
| 2,092,660 A * | 9/1937 | Uttley | ...................... | A47K 1/08 211/65 |
| 3,891,335 A * | 6/1975 | Feil | .................... | A47B 47/0025 403/173 |
| 4,197,808 A * | 4/1980 | Kinninger | ............... | E01F 9/604 116/63 C |
| 4,632,347 A * | 12/1986 | Jurgich | ................ | A47G 21/145 211/70.6 |
| 4,876,771 A * | 10/1989 | Givati | ..................... | D06F 55/00 211/119.13 |
| 4,966,487 A * | 10/1990 | Sinkoff | ..................... | A47F 5/14 403/170 |
| 5,269,251 A * | 12/1993 | Freeman | ................. | E01F 13/02 116/63 C |
| 5,467,548 A * | 11/1995 | Ross | ..................... | E01F 13/022 116/63 C |
| 6,149,487 A * | 11/2000 | Peng | ....................... | A63H 33/08 446/108 |
| 2012/0076970 A1 * | 3/2012 | Suter | ..................... | E01F 13/028 428/80 |
| 2013/0333610 A1 * | 12/2013 | Eccless | ................. | E01F 13/028 116/63 C |

* cited by examiner

*Primary Examiner* — Anita M King
(74) *Attorney, Agent, or Firm* — Limin Wen

(57) ABSTRACT

A unique flat designed caution tape retainer with diamond shape is disclosed. It can be snapped into the top of a traffic safety cone through its two bottom slits and it can hold a caution tape by slipping the caution tape through its side slit into its caution tape slot. Such caution tape retainer can be removed from the traffic cone easily or can stay on the top of the traffic cone when stacking traffic cones. This handy and simple caution tape retainer is easy and inexpensive to manufacture and it solves a persistent problem by neatly holding the caution tape in construction areas or traffic areas without damaging the caution tape or the traffic cone.

6 Claims, 6 Drawing Sheets

ORIGINAL CAUTION TAPE RETAINER

REFERENCE TO RELATED APPLICATION

This application claims the benefit of the filing date of U.S. Provisional Application Ser. No. 61/953,971, entitled "ORIGINAL CAUTION TAPE RETAINER" and filed on Mar. 17, 2014. The teachings of the entire referenced application are incorporated herein by reference.

FIELD OF THE INVENTION

This invention relates generally to a caution tape retainer or holder that can be inserted into an opening in a traffic safety cone or other object for retaining the tape above the cone and establishing a safety zone. The unique design and profile of the caution tape retainer does not damage the caution tape or the traffic safety cone, and permits the traffic safety cones to be stacked on top of one another in a nested fashion for storage with the caution tape retainer installed thereon.

BACKGROUND OF THE INVENTION

People often string brightly-colored caution tape around construction projects, machinery, open electrical units, changed site conditions, and temporary obstructions to limit access to the site and to provide notice that conditions are more dangerous inside the perimeter of the caution tape. Caution tape is often strung between fixed items disposed around the site. When such fixed items are not available in a desired location, the person stringing the caution tape adds a temporary fixture to support the caution tape. When the fixture is located in soft ground, common temporary fixtures include wooden stakes and pieces of spare rebar that may be pounded into the ground. When the fixture is located on hard ground, cement, or asphalt, a weighted bucket or barrel may be used to directly support the caution tape or to support an upwardly extending temporary fixture to support the caution tape. The hassle of providing temporary fixtures for supporting caution tape can lead to people not stringing the tape or taking shortcuts with the location of the tape.

Traffic safety cones are widely available and are a commonly-recognized indicator of a dangerous or uncommon condition. Traffic cones typically stack such that they are easy to store and transport large quantities of the cones. A drawback with barricading a site with traffic cones is that one can readily pass between the cones. Someone who is not paying attention to his direction may thus pass unaware between cones and encounter the uncommon site condition inside the cones. Those facing these barricading problems thus desire a device that may be used with a traffic cone to support caution tape. These people also may wish to use multiple rows of spaced caution tape or to lift a single strip of caution tape above the top of a traffic cone. Another problem encountered when people string caution tape on temporary fixtures is that the tape is often tied to the fixture or twisted around the fixture. When tied or twisted, the tape is pinched or bunched thus reducing the visible surface of the tape. Such pinching and bunching thus reduces the effectiveness of the caution tape.

Oftentimes it is necessary for workers and/or first responders to establish a safety or work zone to complete the task at hand. The creation of such a temporary safety and/or work zone is typically accomplished through a combination of safety cones and caution tape. More specifically, the safety cones are placed along the perimeter of the safety/work zone and strung together using caution tape. For example, when it is desirable to divert traffic or otherwise block off a designated construction zone, construction workers will typically place safety cones along the perimeter of the area being cordoned off and string said cones together With caution tape. Typically, the caution tape is tied or stapled to the cones, which is not only time consuming to install/de-install but also tends to damage the tape and/or cones so that they cannot be reused.

Consequently, there exists in the art a long-felt need for a removable device for attaching caution tape to a safety cone, traffic barrel, etc. There also exists in the art a long felt need for a caution tape retainer or holder that does not cause damage to the caution tape or to the object to which it is attached, thereby enabling the reuse of said items. Moreover, there is a long felt need for a caution tape retainer or holder for removable attachment to a safety cone, wherein a plurality of safety cones may be stacked for easy storage without first having to remove the caution tape retainers or holders attached thereto. Finally, there is a long-felt need for a caution tape retainer or holder that accomplishes all of the forgoing objectives and that is relatively inexpensive to manufacture, and safe and easy to use.

The present invention provides a simple, light-weighted, and removable unique designed caution tape retainer which is easy to use, small with basically one dimension, and inexpensive to manufacture.

BRIEF DESCRIPTION OF THE DRAWINGS

FIG. 1 is a perspective view of caution tape retainers inserted on the top of traffic safety cones with caution tape passing through.

DETAILED DESCRIPTION OF THE PREFERRED EMBODIMENTS

This invention relates generally to a caution tape retainer (1), called original Caution Tape Retainer (CTR), which can be inserted into an opening on the top of a traffic safety cone (2) for retaining the caution tape (3) above the cone and establishing a safety zone. The unique design and profile of the caution tape retainer does not damage the caution tape or the traffic safety cone, and permits the traffic safety cones to be stacked on top of one another in a nested fashion for storage with the caution tape retainer installed thereon.

In the construction situation, currently most people will just wrap the caution tape around the cone and hope it stays up. Others tape the caution tape to the cone but many times someone forgets the tape. Sometimes people cut a slit in the top of the cone which works quite well however the top of the cone eventually becomes worn down and the cone doesn't last as long then. The presented invention provides a solution does the trick and the cones can still be stacked on top of one another.

Figure 1:
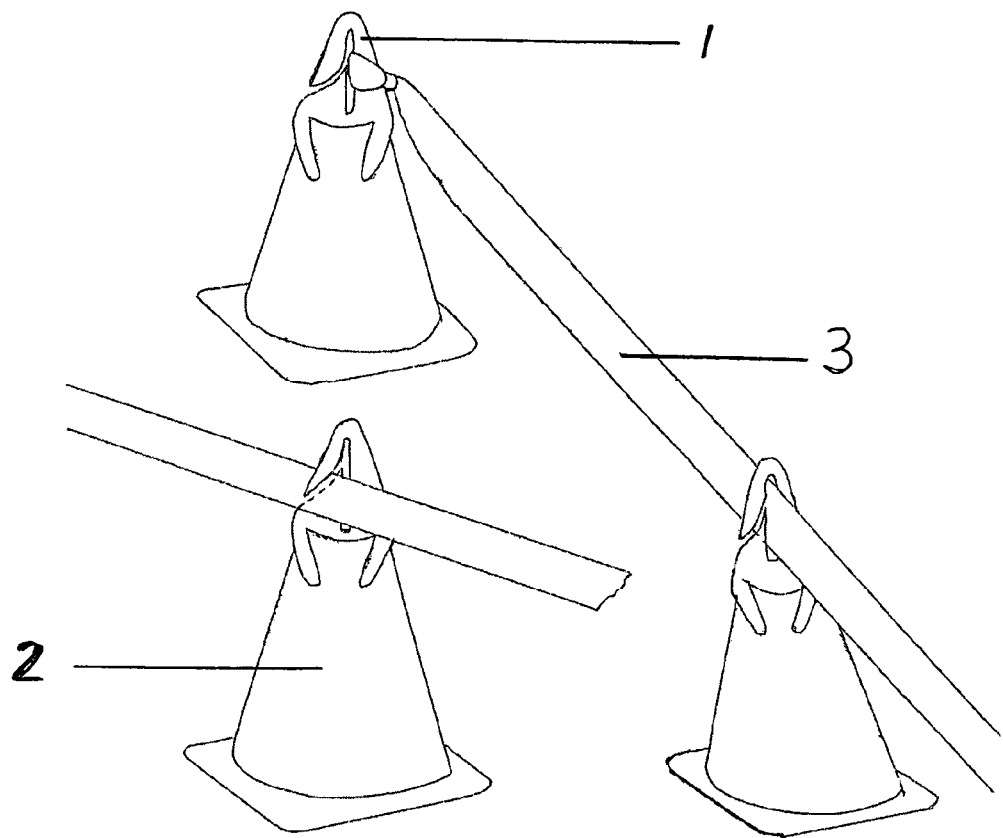

Compared with the invented CTR here, other inventions or products in the art are very large or complicated or very expensive or overkilled. It is not necessary to have heavy duty caution tape holder to hold caution tape which is weighed next to nothing. The current invented CTR is simple, light-weight, and effective. People can place cones down in an area and snap in the retainers then tie the tape to the 1st cone, run along the cones slipping in the tape as you go and then tying on to the last retainer (FIG. 1). There is a side slit (4) along the side of the CTR, so the tape could be slipped into place. No other caution tape retainer has such slit design as described in this invention. With such design, people can also leave the retainers in the cone when the job is complete, remove the tape, and stack the cones on top of each other.

Figure 2A:
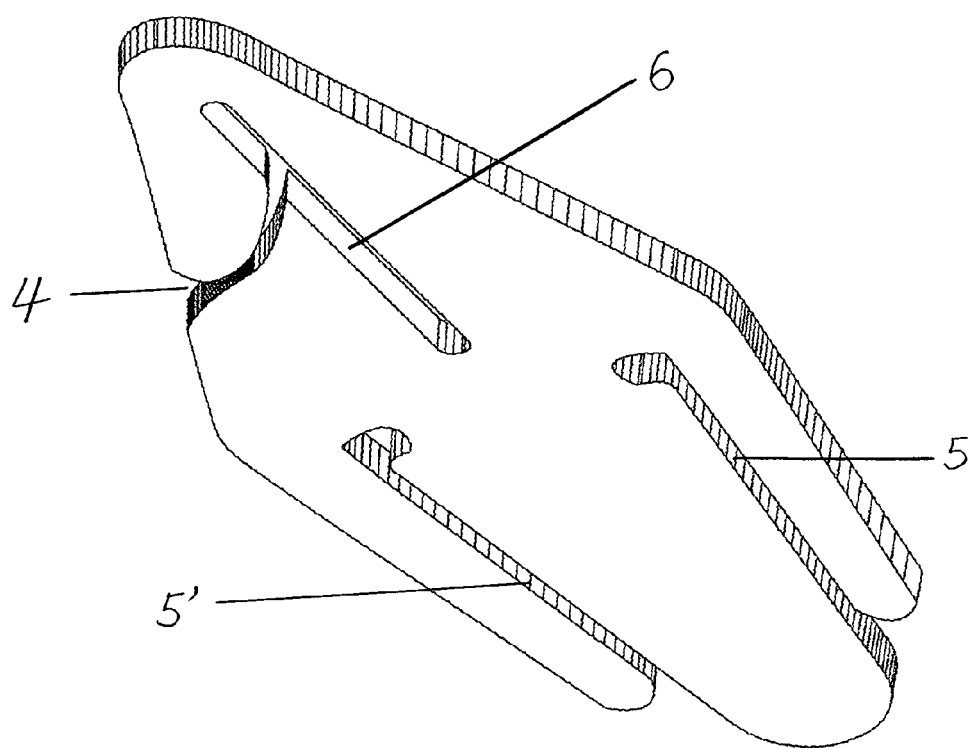
FIG. 2A is a perspective view of a caution tape retainer from one side of the caution tape retainer.
Figure 2B:
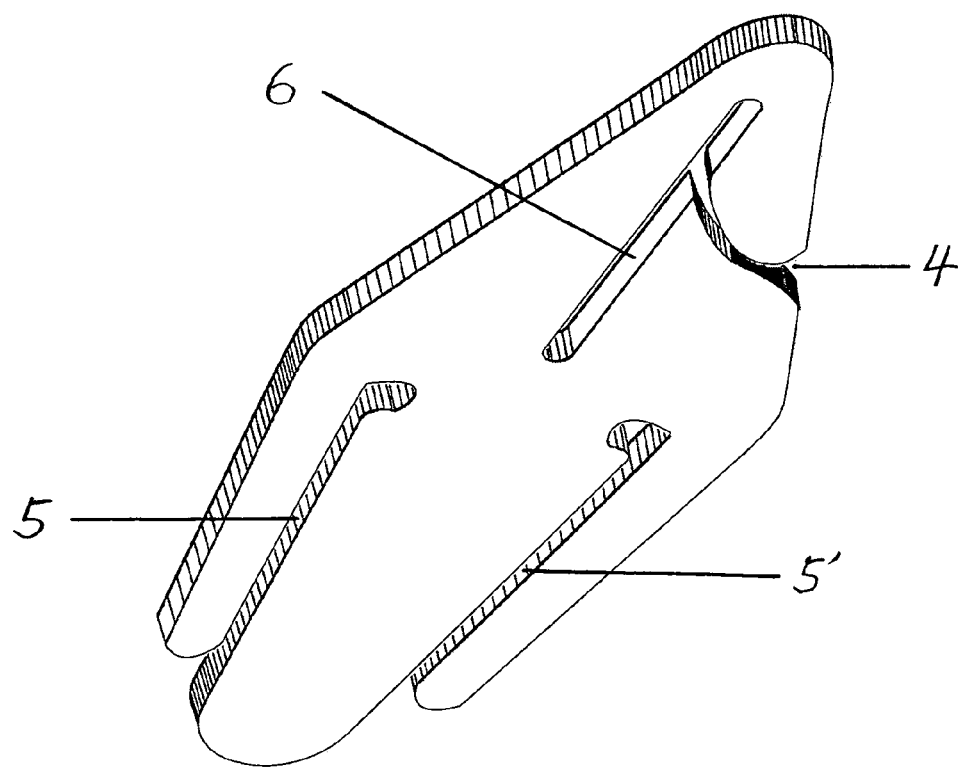
FIG. 2B is a perspective view of a caution tape retainer from another side of the caution tape retainer.

Such CTR can be made in plastic or metal or other suitable/durable materials. For example, it could be made with plastic such as acrylonitrile butadiene styrene (ABS). Also, it is a one dimensional design, which may not need a mold to manufacture it. For instance, it can be cut out of ABS sheets of plastic directly:

The size of such CTR could be 7.25 inches long and 3 inches wide with a shape like diamond. There are two bottom slits (5, 5') which at least 2 inches long at the bottom half of the CTR to snap into the cone, there is a side slit (4) on one side of the top half of the CTR to let the caution tape (3) into the CTR, and there is a caution tape slot (6) which could be 3 inches long in the middle of the top half of the CTR. Also, the said side slit (4) is connected to the said caution tape slot (6), which allows the caution tape (3) go to the said caution tape slot (6) from the said side slit (4), as shown in FIG. 2A and FIG. 2B.

Figure 3A:
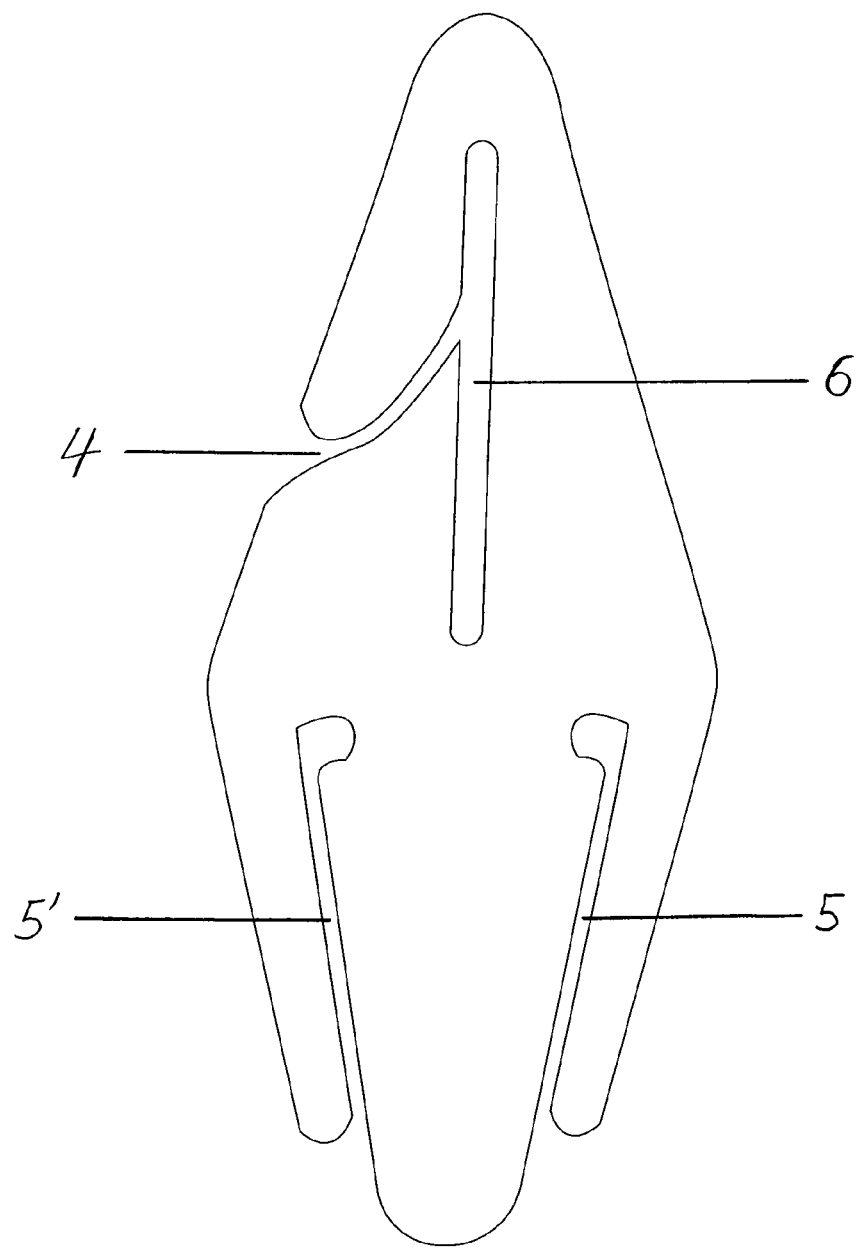
FIG. 3A is a top view of a caution tape retainer laid on one side of the caution tape retainer.
Figure 3B:
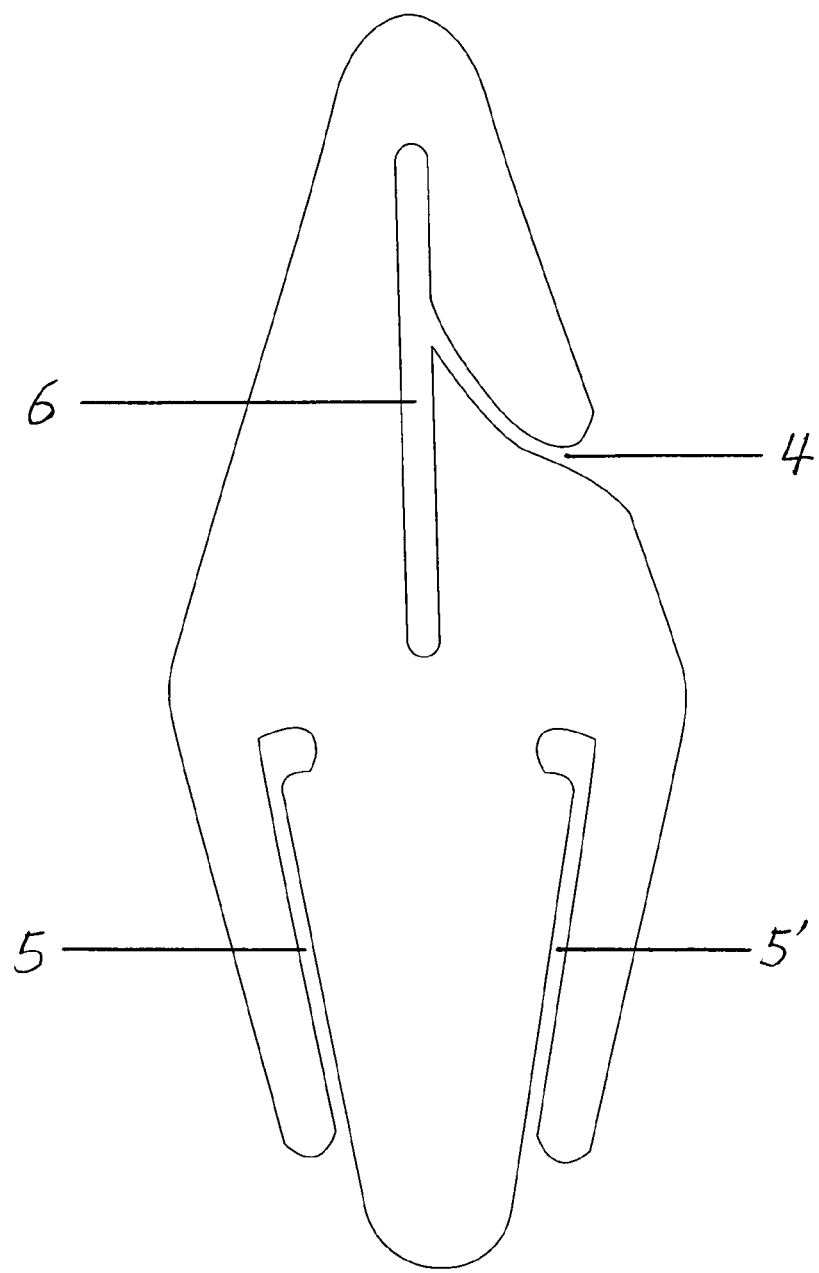
FIG. 3B is a top view of a caution tape retainer laid on another side of the caution tape retainer.

The uniqueness of this CTR is flat design with one dimension, snap-in feature, and a side slit on one side of the CTR (FIG. 3A and FIG. 3B).

Figure 4:
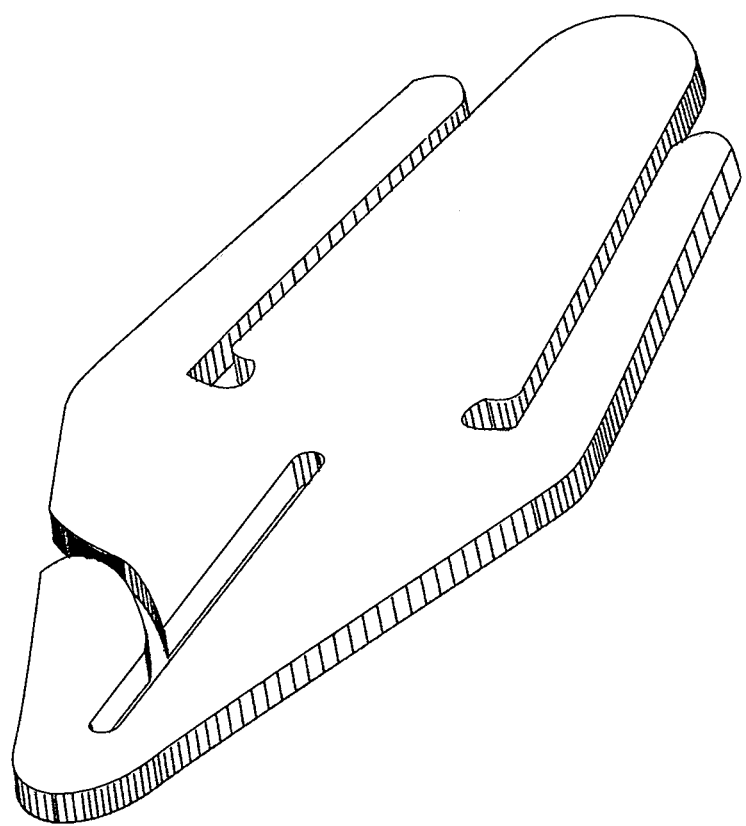
FIG. 4 is a top perspective view of a caution tape retainer.

The invented CTR can be designed in different size, shape, and color as long as has the same above unique features. The present invented CTR is installed easily and removable and reusable (FIG. 4).

The present invented original Caution Tape Retainer (CTR) has the following advantages:
1. Suitable to most of existing traffic cones or safety cones used in the construction area or on the road;
2. Easy to install or remove without any fastening mechanism;
3. Light weight and inexpensive to manufacture and affordable to all the customers;
4. No damage to the traffic safety cone;
5. Safe and last long;
6. One-dimension flat design, portable, easy to carry or for storage;
7. Does not require the use of an adhesive material or tools for mounting;
8. Simple, small, safe, and effective;
9. Snap-in feature with side slit connected to the caution tape slot.

In summary, the present invention provides a novel, handy and simple original caution tape retainer which is easily installed over the top of the traffic safety cone, which is inexpensive and easy to manufacture. It solves a persistent problem by neatly holding the caution tape in construction area or traffic area without damaging the cone it is attached on. Such caution tape retainer has huge and wide applications in all the residential, commercial, and public areas where need safety zones.

Although the caution tape retainer and the method of using the same according to the present invention has been described in the foregoing specification with considerable details, it is to be understood that modifications may be made to the invention which do not exceed the claimed scope of the invention and modified forms of the present invention done by others skilled in the art to which the invention pertains will be considered infringements of this invention when those modified forms fall within the claimed scope of this invention.

What is claimed is:

1. A diamond-shaped flat caution tape retainer which is used to hold a caution tape on top of a traffic safety cone in construction areas or traffic areas, wherein said diamond-shaped flat caution tape retainer has two bottom slits which are at least two inches long for each at the bottom half of said diamond-shaped flat caution tape retainer to snap into said traffic safety cone, wherein said diamond-shaped flat caution tape retainer has a side slit on one side of the top half of said diamond-shaped flat caution tape retainer to let said caution tape slip into said diamond-shaped flat caution tape retainer, wherein said diamond-shaped flat caution tape retainer has a caution tape slot which is three inches long in the middle of the top half of said diamond-shaped flat caution tape retainer, wherein said side slit is connected to said caution tape slot and allows said caution tape slip into said caution tape slot from said side slit.

2. The diamond-shaped flat caution tape retainer in claim 1 is reusable and removable from said traffic safety cone or stays on the top of said traffic cone when stacking traffic safety cones with said diamond-shaped flat caution tape retainer on them.

3. The diamond-shaped flat caution tape retainer in claim 1 is 7.25 inches long and 3 inches wide.

4. The diamond-shaped flat caution tape retainer in claim 1 is made in plastic or metal or other suitable and durable materials.

5. The diamond-shaped flat caution tape retainer in claim 4 wherein the plastic is ABS plastic.

6. The diamond-shaped flat caution tape retainer in claim 1 is light-weighted with one-dimensional design.

* * * * *